United States Patent [19]

Shipp, Jr. et al.

[11] Patent Number: 4,506,343
[45] Date of Patent: Mar. 19, 1985

[54] COLUMN LAYOUT REFERENCE AREA DISPLAY MANAGEMENT

[75] Inventors: Kenneth O. Shipp, Jr., Austin; Richard B. Wood; James T. Repass, both of Round Rock, all of Tex.

[73] Assignee: International Business Machines Corporation, Armonk, N.Y.

[21] Appl. No.: 379,163

[22] Filed: May 17, 1982

[51] Int. Cl.³ .............................................. G06F 3/14
[52] U.S. Cl. .................................... 364/900; 340/706; 340/711; 340/720; 340/721; 340/723
[58] Field of Search ... 364/200 MS File, 900 MS File; 340/706, 711, 720, 723, 721

[56] References Cited

U.S. PATENT DOCUMENTS

| | | | |
|---|---|---|---|
| 3,610,902 | 10/1971 | Rahenkamp et al. | 364/200 |
| 3,623,012 | 11/1971 | Lowry et al. | 364/200 |
| 4,057,849 | 11/1977 | Ying et al. | 364/200 |
| 4,190,835 | 2/1980 | Buynak | 340/724 X |
| 4,278,973 | 7/1981 | Hughes et al. | 340/711 X |
| 4,365,314 | 12/1982 | Badagnani et al. | 364/900 |
| 4,412,294 | 10/1983 | Watts et al. | 364/900 X |
| 4,416,558 | 11/1983 | McInroy et al. | 364/900 X |
| 4,417,322 | 11/1983 | Berry et al. | 364/900 |

OTHER PUBLICATIONS

The Seybold Report on Office Systems, Jul. 1982, vol. 5, No. 7, Patricia B. Seybold.

Primary Examiner—Raulfe B. Zache
Attorney, Agent, or Firm—Harold E. Meier

[57] ABSTRACT

A method for editing data stored in a word processing system in table entry format. Means are provided for operator selection and definition of a top reference area for displaying table column headings or a side reference area for displaying table row entry headings, or both. A vertical separator column of video-reverse spaces separates the display screen into left and right viewports, when a side reference is defined. A horizontal separator bar of video-reverse spaces separates the display screen into top and bottom viewpoints when a top reference is defined. Means are also provided for scrolling the displayed side reference area headings in synchronism with the scrolling of the editable portion of the table, and segmenting the top reference area headings in synchronism with the segmenting of the portion of the editable table entries.

10 Claims, 13 Drawing Figures

| LAYOUT TABLE | VOLUNTARY ED. MEMO | INS | | KYB | |
|---|---|---|---|---|---|
| DSK001 | | | | | |

COLUMN REFERENCE AREA SETUP

| ID | ITEM | YOUR CHOICE | POSSIBLE CHOICES |
|---|---|---|---|
| A | SIDE REFERENCE AREA | 2 | 1 = YES  2 = NO |
| B | NUMBER OF LINES IN TOP REFERENCE AREA | 0 | 0 - 15 |

WHEN FINISHED WITH THIS MENU, PRESS ENTER

TYPE ID LETTER TO CHOOSE ITEM ; PRESS ENTER : ⋈

COLUMN LAYOUT REFERENCE AREA DISPLAY MANAGEMENT

BACKGROUND OF THE INVENTION

1. Field of the Invention

This invention relates to a word processing system and more particularly to a word processing system having means for an operator to select column headings and/or row headings for display while working with tables in a recorded document.

2. Description of Prior Art

Present word processing systems allow an operator to edit a multicolumn table in a visual display area. The editing operation is controlled by operator entered keyboard instructions. When working with large multicolumn tables, it is not possible to display the column headings and the column entries at the same time. The operator is forced to work on the multicolumn table without reference to the column heading which can result in disorientation. Similarly, when the operator is working with tables with long rows, it is not possible to display the row headings and table entries at the same time. Lack of such visual references to the row headings can cause disorientation if the operator forgets which row is being worked on. In addition, such word processing systems provide no method to display both column headings and row headings at the same time the operator is working with a table.

A need has thus arisen for a word processing system to provide operator selectable column and/or row headings as references, and visually displaying such references to the operator while working with recorded documents containing tables. Further, a need has arisen for a word processing system which maintains the displayed column and row heading references in synchronism with the table entries moving vertically and horizontally across a viewport of the display area for the table editing operation.

SUMMARY OF THE INVENTION

The column reference area display management system of the present invention allows the operator to define and visually display a top reference area for column headings, or a side reference area for row headings, or both. A table editing viewpoint is displayed along with the selected reference areas. The displayed side reference is scrolled vertically up or down the side reference area in synchronism with the section of the table displayed in the table editing viewport, controlled by the operator's vertical positioning of the cursor in the table. The operator defined column headings displayed in the top reference area are segmented horizontally across the top reference area in synchronism with the section of the table displayed in the table editing viewport, controlled by the operator's horizontal positioning of the cursor.

While working with tables, the operator may elect to display table headings (which may run horizontally across the top of the table or may constitute the first column of the table on the side of the table) and table entries at the same time regardless of how far the headings are from the table entries. The operator presses a key to display the column reference area menu for setting up the top and side reference areas.

If the operator specifies the first option to define a side reference area, the first column will display in the left side of viewport on the display area, provided a column is not inserted prior to the first column. A vertical separator display column will appear on the display area to separate the first column from the rest of the viewport. The operator will be able to see the row headings in the side reference area while inserting or revising other columns. If the operator does not select this side reference option, then the video display screen will not be divided into left and right viewports.

The second operator selectable option available from the column reference area menu is the selection and definition of the top reference area. The option is defined by the operator's entry of the number of lines to be reserved for the reference area at the top of the table editing viewport. If the top reference area option is selected by the operator, a horizontal separator bar of video-reverse spaces separates the top reference area from the remainder of the viewport. If the option is not specified, then no top reference area will be defined. In the preferred embodiment, the operator may define up to fifteen lines in the top reference area.

When the operator is finished with the column reference area set up menu, the column layout menu will be redisplayed. The operator defined reference area will not be shown until the column typing operations are performed.

The operator carries out the table editing operation by creating instructions during the column typing operations. At the conclusion of the revisions, the operator presses an ENTER key, which causes the instructions to be carried out to edit the column. The operator then may display the edited table. The operator may press the CANCEL key at any time during the editing of the table prior to pressing the ENTER key to cancel all the editing instructions. In addition, the operator's selection and definition of top and side reference areas are stored, and the operator does not have to reset the table reference areas for subsequent editing operations.

The operator defined top and/or side reference areas are maintained in synchronism with the table section displayed in the viewport, regardless of where the cursor is placed in the table editable area. A page of the text where the editable table is located is stored in a text storage buffer. The operator editing instructions are interfaced with the text storage buffer through a text storage buffer manager. The word processing system includes a display access method that interfaces through the text storage buffer and places it on the video display. A top reference buffer area is generated in RAM to store the operated selected top reference area. The editable column is also read into an area generated in RAM, the editable column text storage buffer. The side reference area is contained within the text storage buffer and is not copied into another buffer. The side reference area is identified by pointers set to the first column in the buffer.

BRIEF DESCRIPTION OF THE DRAWINGS

For a more complete understanding of the present invention and further objects and advantages thereof, reference is now made to the following detailed description taken in conjunction with the accompanying drawings in which:

FIGS. 5A-I illustrates examples of table reference area screen displays.

DESCRIPTION OF THE PREFERRED EMBODIMENT

Figure 1:
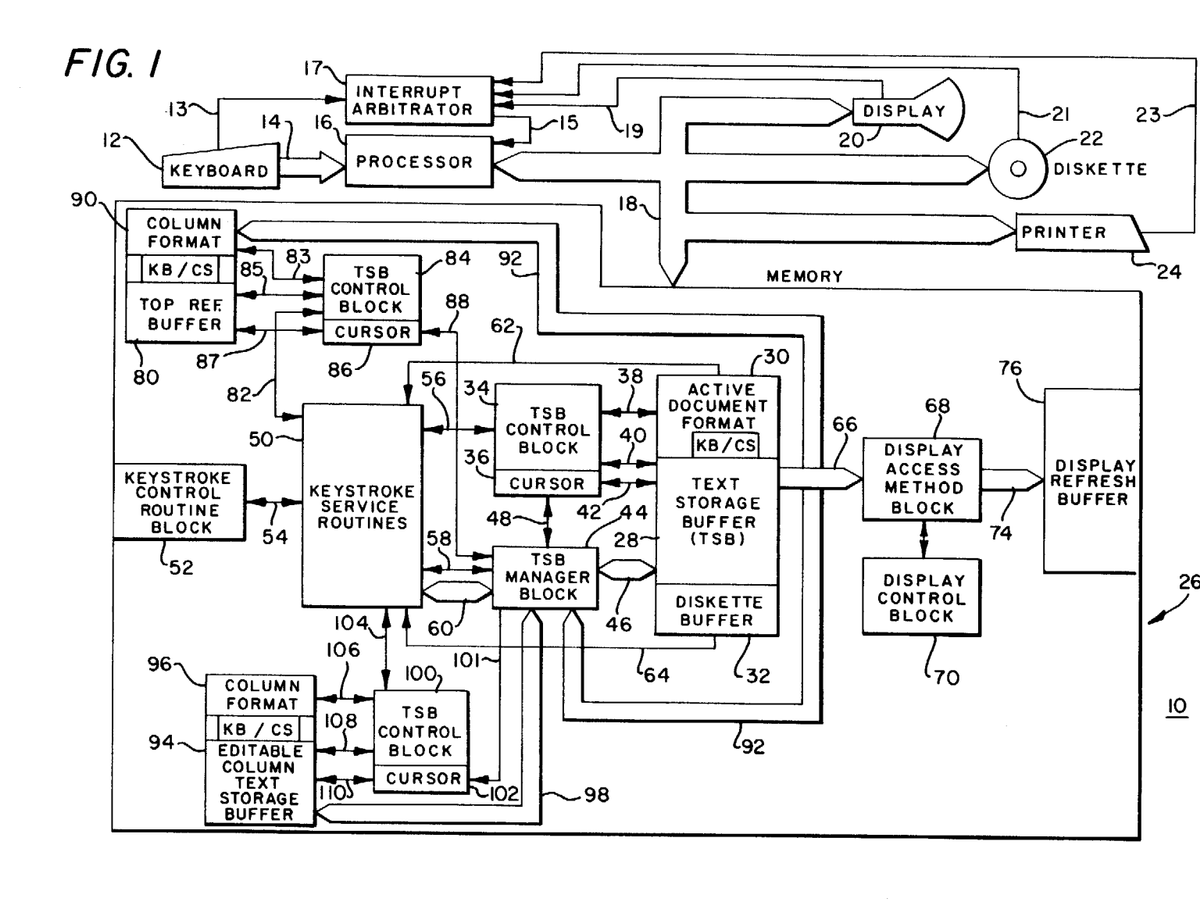
FIG. 1 is a block diagram of a word processing system utilizing the present invention.

Referring to FIG. 1, there is shown a word processing system 10 which includes a keyboard 12 for receiving text character entries and transmitting the text to a signal path 14 to a microprocessor 16. The processor 16 may be implemented by a commercially available microprocessor, such as the Intel Corporation's 8086 processor. The Intel 8086 processor executes on one level with one set of registers. A memory bus 18 couples the processor 16 to a CRT display 20, a diskette drive 22, a printer 24 and a random access memory 26. The processor 16 performs the various control functions necessary for the word processing system 10 to process, edit and display data.

The keyboard 12 also applies a hardware interrupt signal via interrupt line 13 to an interrupt arbitrator 17. The 8259-A Interrupt Controller was selected to implement the interrupt arbitrator 17 to resolve interrupt requests from the incoming interrupt lines. The 8259-A Interrupt Controller may resolve interrupt requests from up to eight interrupt lines into eight priority levels for the 8086 processor 16 and communicates with the processor 16 over signal path 15. The display 20, diskettes 22, and printer 24 apply interrupt signals to the interrupt arbitrator 17 over signal paths 19, 21 and 23, respectively.

An operator enters a text stream through the keyboard 12. Each page of the text is stored and processed in the memory 26. As the text stream is received in the memory 26, it is simultaneously presented to the display 20. After the buffering of the text in the text storage buffer 28 of memory 26, the stream can be saved on to diskette 22 or hard copy outprinted on printer 24.

The random access memory 26 includes a number of data areas and functional programs for operating with the text stored in the word processing system 10. The text and ready control functions are saved in the text storage buffer (TSB) 28 which includes an active document format storage section 30 and a diskette buffer section 32. The active document format storage section 30 and TSB 28 communicate with a TSB control block 34 via signal paths 38 and 40. The TSB 28 communicates with a cursor 36 over a path 42. A TSB manager block 44 passes data to the TSB 28 over a data bus 46.

As each character is entered through the keyboard 12, it is processed by one or more of the keystroke service routines stored in memory location 50 as executed by the processor 16. A keystroke control routine block 52 communicates with the keystroke service routines 50 over path 54. The keystroke service routines 50 communicate with TSB manager block 44 over signal path 58 and bus 60. The active document format section 30 and TSB diskette buffer 32 communicate with keystroke service routines 50 over signal paths 62 and 64, respectively. Also, the text stream stored in the TSB 28 is simultaneously entered via data bus 66 to display 50 memory block 68 and bus 74 into a display refresh buffer 76 which drives the display 20. A display control block 70 and the display method block 68 provide a viewport or window which may be both vertically scrolled and horizontally segmented relative to the contents of the text storage buffer 28. Both the diskette drive 22 and the printer 24 have dedicated buffer areas assigned to them. The display control block 70 also serves to store flags and status information as required by the operation of the display access method block 68.

A top reference storage buffer 80 is defined in memory 26 to store the operator defined top reference area. The operator entered instructions are processed by the keystroke service routines 50 connected by a signal line 82 to a text storage buffer (TSB) control block 84. A cursor 86 to the top reference storage buffer 80 communicates with the TSB manager block 84 through a signal line 88. A column format storage area 90 is included as part of the top reference storage buffer 80 and is connected via a data bus 92 to the TSB manager block 44. The top reference TSB control block 84 communicates with column format 90 and top reference buffer 80 via path 83 and 85, respectively. The cursor 86 communicates with top reference buffer 80 over path 87.

Another text storage buffer, an editable column text storage buffer (TSB) 94, is also defined in memory 26. The editable column TSB buffer 94 includes a column format storage area 96. The editable column TSB 94 is connected to the TSB manager block 44 via a data bus 98. An editable column TSB control block 100 and its associated cursor 102 communicate with TSB manager block 44 over signal path 101. The editable column TSB control block 100 communicates with the keystroke service routines 50 through a signal path 104. The editable column TSB control block 100 communicates with the column format 96 through a signal line 106, and the editable column TSB 94 through signal path 108. The cursor 102 communicates through a signal path 110 to the editable column TSB 94.

As the operator enters each keystroke at keyboard 12, a corresponding signal is transmitted to the processor 16 over signal path 14 which enters the keystroke command to the memory 26. Upon receipt of the signal, the keystroke routine is invoked for keystroke service routine block 50 in order to process the keyed command. The keyed command is executed by the processor 16 according as to whether it is a control command or a graphic command (text character) entry. The process command is entered into the TSB 28. While graphics and commands are built up in the TSB 28, the text information is retained in display refresh buffer 76 and presented at the display 20.

By actuating a control command, an operator can transfer information about the memory 26, display 20, diskette drive 22, and printer 24. Pages can be called from the diskette 22 and the memory 26 so that the operator can make changes and corrections to the text and then enter the corrected text into the diskette 22 or have the corrected text hard copies on the printer 24.

Figure 2:
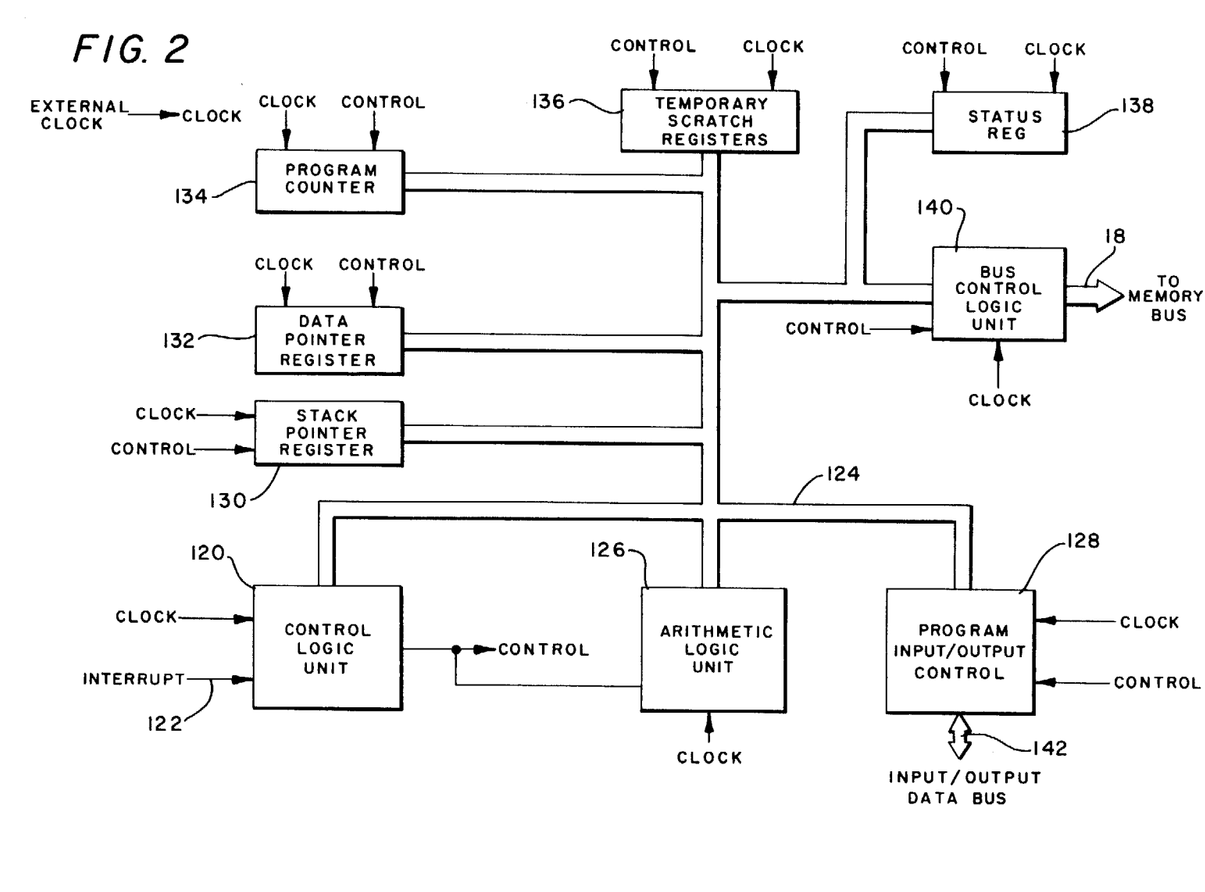
FIG. 2 is a block diagram of the processor illustrated in FIG. 1.

Referring to FIG. 2, the processor 16 is shown in further detail to show the typical hardware elements found in such processors. The processor 16 includes a control logic unit 120 which receives priority interrupt signals from the interrupt arbitrator 17 (FIG. 1) over signal path 122. The control logic unit 120 communicates via a two-way data and address bus 124 to an arithmetic logic unit 126, a program I/O control 128, stack point register 130, data point register 132, program counter 134, temporary scratch registers 136, status registers 138 and bus control logic unit 140.

In response to a fetch instruction from the random access memory 26, the control logic unit 120 generates control signals to the other logic units of the processor, including the arithmetic logic unit 126, the program I/O control 128, the program counter 134, temporary scratch register 136, and bus control logic unit 140. Data processed in the processor 16 is input through the bus control unit 140 connected to the memory bus 18. The program I/O control 128 is connected to the input-/output data bus 142. The bus control logic unit 140 connected to the memory bus 18 receives instructions for processing data to the input/output control 128. The synchronous operation of the control logic unit 120 with other logic elements of the processor 16 is achieved by means of clock pulses input to the processor 16 from an external clock source. Different storage sections of the random access memory 26 are identifiable for instruction storage and data storage.

Processed data from the processor 16 is output through the program I/O control 128 to the I/O data bus 142. Input data on the data bus 124 is passed internally through the processor 16 to the control logic unit 120 by the arithmetic logic unit 126. The arithmetic logic unit 126, in response to a control signal from the control logic unit 120 and in accordance with instructions received on the memory bus 18, performs arithmetic computations which may be stored in the temporary scratch registers 136. Other transfers of data between the arithmetic logic unit 126 and other logic elements of the processor 16 are possible. Such additional transfers may be to the program counter 134, the data point register 132 or stack point register 130.

Also in a data stream for these various object elements and a means of the internal data bus 124 is the status register 138. Operation of the processor 16 is determined by instructions on a memory bus 18 and input data on the input/out-put data bus 142. As an example of the operation in response to instructions, the processor 16 may transfer data stored in the scratch registers 136 to one of the registers 130, 132 or 138. Such operation of the processor 16 as detailed in FIG. 2 are well known to those in the data processing field. A more detailed description of each operation of the processor 16 is not necessary for a complete understanding of the invention as claimed.

Figure 3:
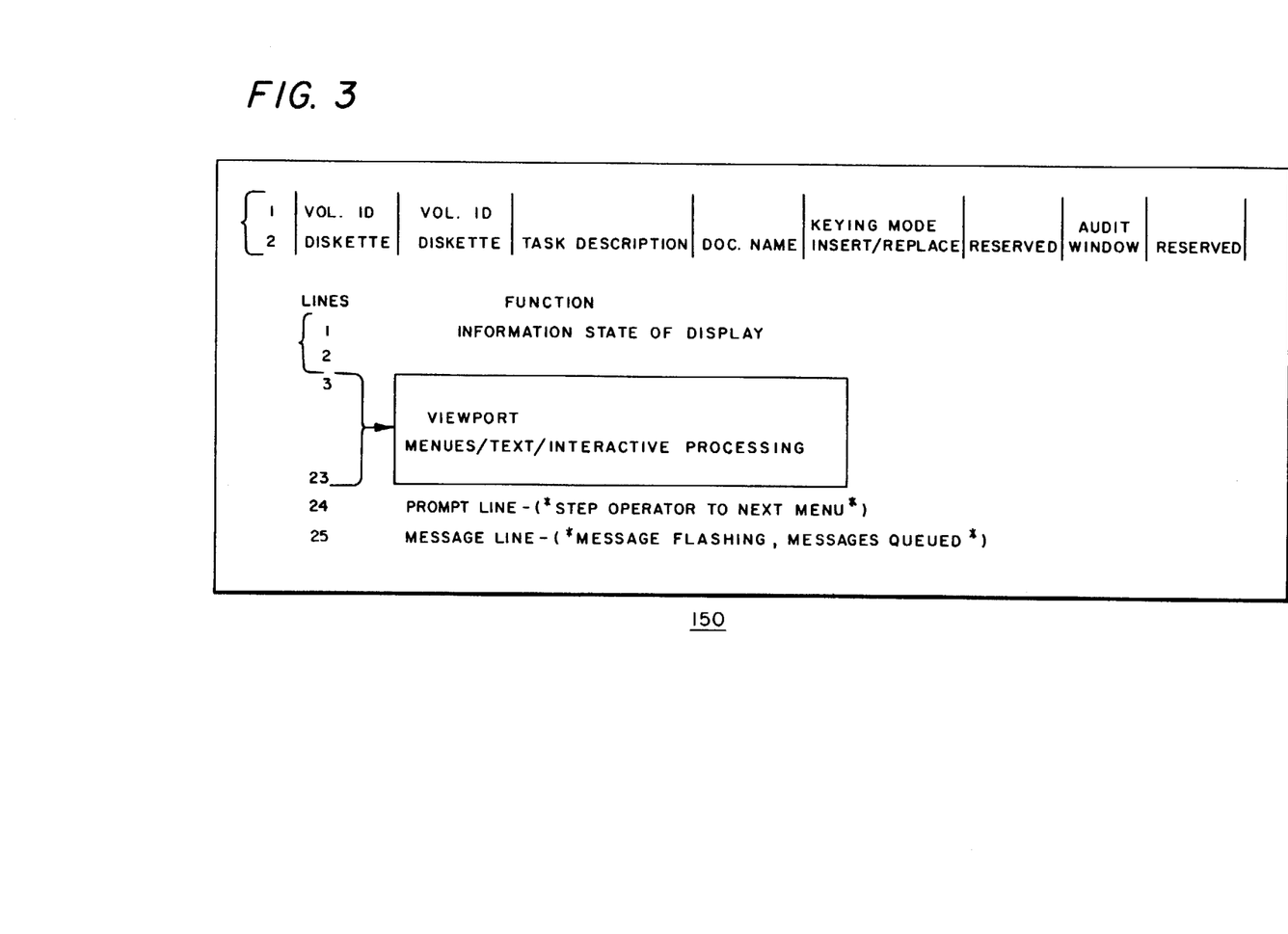
FIG. 3 is an illustration of a display screen layout of a word processing system utilized in the present invention.

Referring now to FIG. 3, a screen layout 150 of the display appearing on display 20 is illustrated. A typical screen layout 150 is partitioned such that lines 1 and 2 of the screen heading contain system information. The indented lines 1 and 2 of the body of the display are typically partitioned so that they are status lines reflecting the information state of the display. The lines following the status lines, lines 3-23, define a viewport to set out menus, text, or information necessary for interactive processing. In normal text display, the third line would be a scale line spanning the entire width of the screen layout 150. As described hereinbelow, the scale line may be included in the viewport for the editable column. Line 24 is a prompt line which provides information instructing the operator on the next menu function or activity. Line 25 is a message line which indicates where the messages are flashing or queued.

Figure 4:
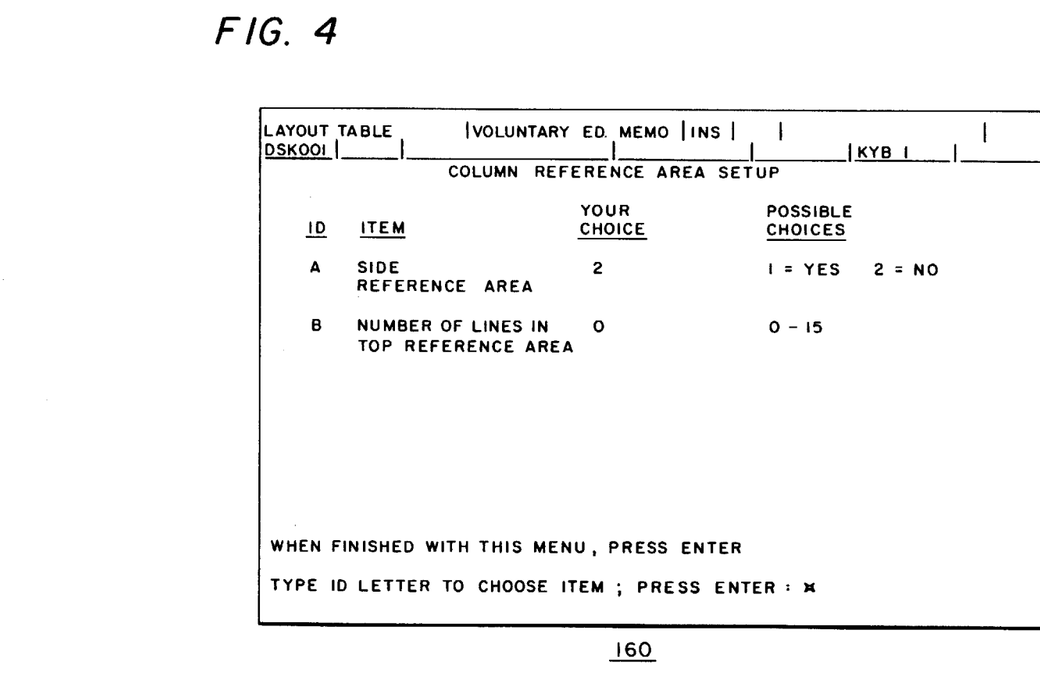
FIG. 4 is a drawing of a column reference area set up menu.

Referring now to FIG. 4, a column reference area menu 160 is displayed on the display 20 in response to the operator's depressing that key on the keyboard 12 in order to set up the reference areas. The reference areas menu 160 provides the operator with a first option to define a side reference area and a second option to define the number of lines in the top reference area. The message line at the bottom of the menu 160 instructs the operator to type the ID letter to choose an item on the menu. In FIG. 4, the operator has entered the letter "2", indicating that no side reference area is to be defined. If the ID letter "1" is entered, the operator has specified a side reference area to cause the first column to be displayed in the left side of the viewport for the editable column, unless a column is inserted prior to the first column which would then cause it to display in that area. In the second option for the definition of a top reference area, the operator may enter "0" as the default for this operation. The operator's entries of the numbers "1-15" specifies the selection of a top reference area, and the number selected specifies the number of lines to be reserved for a reference area at the top of the viewport. If the number of lines specified on the top reference area exceeds the number of lines in the column being revised, then carrier returns will be inserted into the reference area to match the number of lines specified. The prompt line advises the operator to press the ENTER key following the reference area set up.

Figure 5:
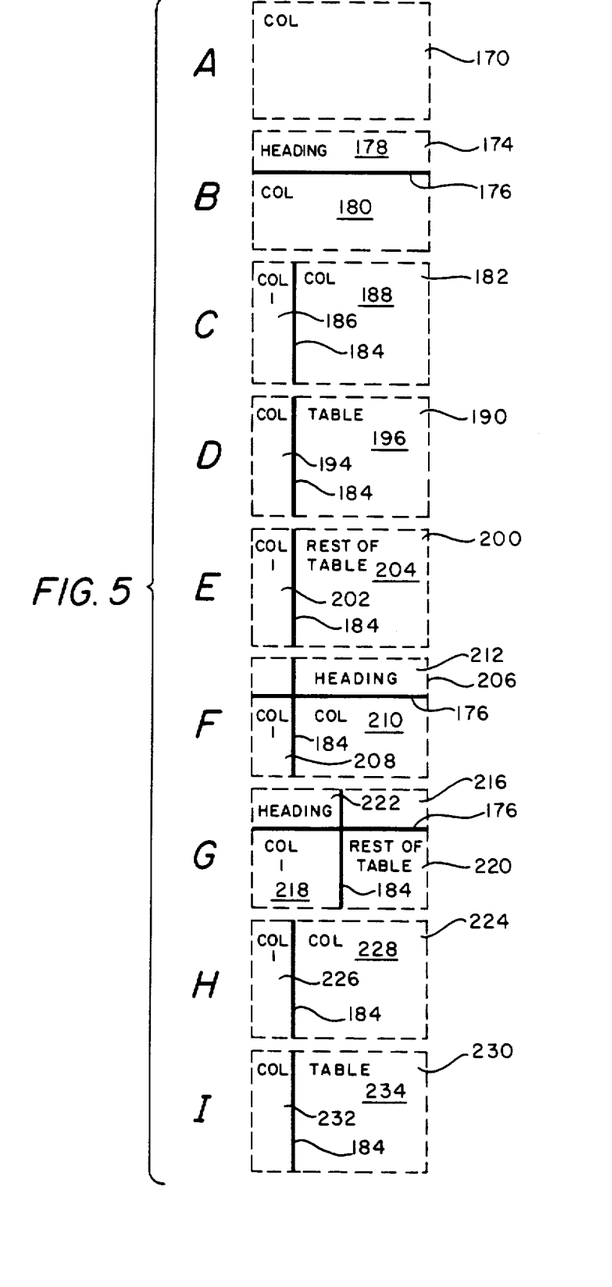

Referring now to FIG. 5, reference screen examples are provided illustrating the reference area screen formats which may be created from the column reference area set up menu 160.

FIG. 5A illustrates the display screen format 170 when no top or side reference area have been defined in the column insert or revise function. Only the column to be inserted or revised is displayed.

FIG. 5B illustrates a display screen format 174 for column revision where the operator has defined a top reference area but no side reference area. A horizontal separator display bar 176 extends across the display, creating a top reference area viewport 178 and an editable column viewport 180. The horizontal display bar 176 is a line of video-reverse spaces and the position the bar 176 appears on the screen format 174 is determined by the number of lines the operator has defined for the top reference area viewport 178. The heading for the table being revised is displayed in the top reference area viewport 178, and the column of the table revised is displayed in the available column viewport 180.

FIG. 5C illustrates a reference screen format 182 for either column insert or revise function when the operator has selected a side reference area but defaulted on the top reference area option. Since the column to be inserted or revised is not the first column, the first column of the table on which the operator is working is inserted in the side reference area. A vertical separator display column 184 divides the screen into a left side reference viewport 186 and a right editable column viewport 188. The vertical separator display column 184 is a line of video-reverse spaces and the position the column 184 appears on the screen format 182 is determined by the width of column 1.

FIG. 5D illustrates an example of a reference screen 190 in which the operator has defined no top reference area but a side reference area for inserting a column before column 1 of the table. The vertical separator display column 184 divides the reference screen 190 into a left viewport 194 and right viewport 196. The left viewport 194 is for the entry of the column insert, and the right viewport 196 serves as the side reference area to display the table.

FIG. 5E is an example of a reference screen 200 of display 20 in which the operator has not defined a top reference area but a side reference area for a column revision in which the column equals one. The vertical separator display 184 separates the screen 200 into a left viewport 202 and a right viewport 204. The viewport 202 is defined as the editable column viewpoint for the editing of column 1, and the right viewport 204 is reserved as the side reference area for the rest of the table.

FIG. 5F illustrates an example of a reference screen 206 in which the operator has selected both a top reference area and side reference area. Reference screen example 206 is for the column revise operation when the column to be edited is other than column 1. The vertical separator display bar 184 separates a side reference viewport 208 on the left from the editable column viewport 210 on the right. The horizontal reference bar 176 provides a top reference viewport 212 for the reserved table heading for the editable column viewport 210.

FIG. 5G is an example of a reference screen 216 which is essentially the reverse of that illustrated in FIG. 5F and described hereinabove. In reference screen 216, the operator has defined a top reference area and a side reference area for the column revise operation, but the column to be revised is column 1. As a result, the vertical separator display bar 184 defines a left viewport 218 which is the editable column viewport and a right viewport 220 which is the side reference area for the rest of the table. The horizontal bar 176 extends across the screen and separates the top reference area 222 appearing on the left side from the editable column viewport 218 below it.

FIG. 5H illustrates a reference screen 224 in which the operator has defined a top reference area and side reference area for the column insert operation when the column is other than column 1. The vertical separator display column 184 defines a left viewport 226 for the side reference area for displaying column 1 and a right viewport 228 for the editable column viewport for the column to be inserted.

In FIG. 5I, a reference screen 230 is illustrated in which the operator has defined a top reference area and a side reference area for the column insert operation before column 1. The vertical separator display column 184 defines a left viewport 232 as the editable column area and a right viewport 234 for the defined side reference area to display the table.

The pseudocode listings provided below are used in conjunction with operating systems produced by the IBM Corporation for its DISPLAYWRITER word processing system to carry out the present invention. The application and use of pseudocode is described in "An Introduction To Programming", (a structural approach using PL/1 and PL/C-7), Second Edition, by Richard Conway and David Gries, Winthrop Publishers, Cambridge, Mass., Copyright 1975.

PSEUDOCODE LISTING #1

BEGIN (TLCSCNFM) Process Reference Area Menu
1. SET UP/INITIALIZE WORK AREA
1. if no ref areas are desired
2. set the default value to none
1. else
2. store the specified values in the proper work and restore locations
1. endif
1. UNTIL RETURN.CODE FROM MENU IS NOT CANCEL WITH OPTION CHANGE DO
2. POST REFERENCE AREA SETUP MENU
2. IF RETURN CODE FROM MENU IS CANCEL THEN
3. RESTORE THE OPTION VALUES
3. RESET THE CHANGED FLAG
2. ENDIF
2. LOAD OPTION VALUES FROM WORK LOCATION
1. ENDDO
1. if reference areas defined then
2. COPY SPECIFIED VALUES TO THE COLUMN LAYOUT CONTROL BLOCK
1. endif
1. release work area
1. RETURN
END (TLCSCNFM)

PSEUDOCODE LISTING #2

Begin (TCLRSCN) REFERENCE SCREENS
1. GET REFERENCE SCREEN DATA FROM THE COLUMN CONTROL BLOCK
1. IF FUNCTION IS COLUMN CREATE THEN
2. SET THE NUMBER OF LINES IN TOP REF. AREA TO ZERO
1. ENDIF
1. DETERMINE THE SCREEN WIDTH/LENGTH AND PUT INTO THE REFERENCE SCREEN CONTROL BLOCK
1. GET THE COLUMN NUMBER TO BE EDITED
1. GET THE WIDTH OF THE COLUMN TO BE EDITTED
1. CALL (SETUP SCREEN ATTRIBUTES)
1. IF MULTI-SCREEN FLAG IS ON THEN
2. IF TOP REFERENCE AREA TO BE BUILT THEN
3. COPY PARAMETERS FROM THE TOP REF SCREEN ATTRIBUTES TO THE TOP REFERENCE DCB
2. ENDIF
2. IF SIDE REFERENCE AREA TO BE BUILT THEN
3. COPY PARAMETERS FROM THE SIDE REF SCREEN ATTRIBUTES TO THE SIDE DCB
2. ENDIF
2. COPY PARAMETERS FROM THE EDIT SCREEN ATTRIBUTES TO THE EDIT DCB
2. COPY THE STARTING LINE AND WINDOW SIZE FROM THE DCB TO THE REFERENCE SCREEN CONTROL BLOCK
2. INVOKE (TCLOPENS) TO OPEN THE WINDOWS
1. ENDIF
1. RETURN
END (TCLRSCN)
BGNPROC (SETUP SCREEN ATTRIBUTES)
1. TOP REF (START COLUMN)=1
1. EDIT (START COLUMN)=1
1. TOP REF (WIDTH)=SCREEN WIDTH
1. EDIT (WIDTH)=SCREEN WIDTH
1. IF NUMBER OF LINES IN TOP REFERENCE AREA≠0 THEN
2. SET THE FLAG FOR MULTI-SCREEN
2. SET THE FLAG FOR TOP REFERENCE AREA
2. TOP REF (START LINE)=4
2. TOP REF (NUMBER OF LINES)=NUMBER OF LINES IN TOP REFERENCE AREA
2. EDIT (START LINE)=TOP REF (NUMBER OF LINES)+5

2. EDIT (NUMBER OF LINES)=SCREEN LENGTH−EDIT (START LINE)−1
1. ELSE
2. EDIT (START LINE)=3
2. EDIT (NUMBER OF LINES)=SCREEN LENGTH−4
1. ENDIF
1. IF SIDE REFERENCE AREA=YES THEN
2. SET THE FLAG FOR MULTI-SCREEN
2. SET THE FLAG FOR SIDE REFERENCE AREA
2. TEST WIDTH=COLUMN1 1 WIDTH
2. IF EDIT COLUMN NUMBER=1 THEN
3. TEST WIDTH=SCREEN WIDTH
2. ENDIF
2. SIDE REF (WIDTH)=THE MINIMUM OF TEST WIDTH AND SCREEN WIDTH/2
2. EDIT (WIDTH)=SCREEN WIDTH−L/R REF (WIDTH)−1
2. IF EDIT COLUMN NUMBER≠1 THEN
3. SIDE REF (START COLUMN)=1
3. EDIT (START COLUMN)=SIDE REF (WIDTH)+2
2. ELSE
3. SIDE REF (START COLUMN)=EDIT (WIDTH)+2
3. EDIT (START COLUMN)=1
2. ENDIF
2. IF NUMBER OF LINES IN TOP REFERENCE AREA≠0 THEN
3. SIDE REF (START LINE)=EDIT (START LINE)
3. SIDE REF (NUMBER OF LINES)=EDIT (NUMBER OF LINES)
3. TOP REF (WIDTH)=EDIT (WIDTH)
3. TOP REF (START COLUMN)=EDIT (START COLUMN)
2. ELSE
3. SIDE REF (START LINE)=4
3. SIDE REF (NUMBER OF LINES)=SCREEN LENGTH−5
2. ENDIF
1. ENDIF
ENDPROC (SETUP SCREEN ATTRIBUTES)

PSEUDOCODE LISTING #3

Begin Open Screens
1. If a top reference screen is to be built then
2. Use the top reference DCB to clear the top part of the screen and draw the horizontal separator line
2. Store the reference screen tsb cb address
2. Store the reference screen cb address
2. set parameters for open
2. Open the top reference screen window
2. Open the top separator line window
2. Invoke TCLDSPLY to build the screen
2. Save window left screen position
1. Endif
1. If the side reference screen is to be built then
2. Use the side reference screen DCB to draw a vertical separator line
2. Save the number of lines, width, start line, and start column
2. Open the side reference screen
2. Invoke TCLDSPLY to build the screen
1. Endif
1. Set up to open editable window
1. Open the editable window
1. Invoke TCLDSPLY to build the editable screen
1. determine the line position of the editable screen
1. fetch and store the cursored line no.
End Open Screens

PSEUDOCODE LISTING #4

BEGIN (TCLDSPLY) BUILD MULTIPLE DISPLAY WINDOWS
1. IF INPUT REQUEST IS TO BUILD AND IF INPUT REQUEST IS NOT TO BUILD WITHOUT THE CURSOR THEN
2. TURN ON TEXT AND SCALE CURSOR SUPPORT IN THE DCB
1. ENDIF
1. TURN OFF INPUT REQUEST FLAG THAT INDICATES THAT THE CURSOR IS NOT NEEDED
1. BUILD/UPDATE THE DISPLAY
1. IF THE "MULTI-SCREEN" FLAG IS ON THEN
2. IF TOP SCREEN IS ACTIVE THEN
3. IF THE EDIT SCREEN HAS SEGMENTED THEN
4. THIS CAN BE DETERMINED BY COMPARING THE SAVED WINDOW LEFT VALUE TO THE CURRENT VALUE IN THE DCB
4. SAVE THE CURRENT VALUE OF THE WINDOW LEFT VALUE OF THE EDIT DCB
4. ADJUST THE TOP WINDOW LEFT BY THE SEGMENTATION AMOUNT OF THE EDIT SCREEN
4. BUILD THE TOP REFERENCE SCREEN
3. ENDIF
2. ENDIF
2. IF SIDE SCREEN IS ACTIVE THEN
3. GET PARAMETERS FOR SIDE REFERENCE SCREEN
3. IF FIRST TIME THEN
4. ADJUST WINDOW LEFT OF REFERENCE SCREEN
4. IF EDIT COLUMN=1 AND NOT COLUMN INSERT THEN
5. WINDOW LEFT=NEXT COLUMN LEFT EDGE DIVIDED BY FONT WIDTH
4. ELSE
5. WINDOW LEFT=TABLE LEFT EDGE DIVIDED BY FONT WIDTH PLUS COLUMN 1 GUTTER WIDTH
4. ENDIF
4. DO A BUILD WITHOUT TRANSFERING CURSOR
3. ENDIF
3. ADD DELTA Y OF EDIT SCREEN TO "SAVE DELTA Y"
3. BUILD THE SIDE REFERENCE SCREEN
2. ENDIF
1. ENDIF
END (TCLDSPLY)

In operation of the column layout reference area display management system of the present invention, the operator may display table headings and table entries while working with tables, regardless of how far the headings are from the entries. In operating keyboard controls, the operator calls up the column reference area menu for display. The operator is presented with the choice of defining a side reference area or not, or defining a top reference area or not, including the number of lines to be included in the top reference area. When the operator has finished with selections from the menu, the ENTER key is pressed for setting up the column reference area. The column reference area set up will resemble one of the examples of the reference screen displays illustrated in FIG. 5. If a column is inserted before the first column or if the first column is being revised, the left portion of the display screen is the editable portion and the right portion of display screen becomes the reference area. The reference portion of the display screen is not editable. The cursor will always be in the editable portion of the display. The operator cannot cursor pass the separator while in the reference area, and scrolling or segmenting data from the reference area into the editable portion of the display is not permitted.

A maximum size may be defined for this side reference area, which in the preferred embodiment is one-half the width of the screen. Similarly, the maximum size is defined for the top reference area, which in the preferred embodiment is fifteen lines: The reference area screen headings will scroll (vertically) as the editable screen or viewport scrolls. Similarly, the top reference area screen headings will segment (horizontally) as the editable screen or viewport segments across the display.

When the operator has finished with the definitions in the column reference area setup menu, the column layout menu will be redisplayed. The defined column reference areas will not be shown on the display until the column typing operations are performed.

In revising a column, the top and side column reference areas, as defined by the operator, will be displayed during column revise. If the first column is being revised, then it will appear on the left side of the viewport as the editable portion, and the remainder of the table will be shown on the right side as the side reference area. If reference areas were defined in column layout, then the scale line will reside on line 3 of the display and will reflect the editable portion of the viewport. If the side reference area is selected, a partial line scale which reflects the editable portion of the viewport will be displayed.

In inserting a column, if the side reference area is displayed then a scale line will be a partial line scale line which only reflects the editable portion of the viewport. The remainder of the scale line on the display will be blank.

Although preferred embodiments of the invention have been illustrated in the accompanying drawings and described in the foregoing detailed description, it will be understood that the invention is not limited to the preferred embodiments disclosed, but are capable of numerous rearrangements, modifications, and substitution of parts and elements not departing from the spirit of the invention.

What is claimed is:

1. A column reference area display management method for use in a word processing system including a keyboard, processor, memory and display, comprising the steps of:

storing a multicolumn table to be displayed on said display in a first dedicated portion of said memory, said multicolumn table having a plurality of columns and rows;

generating commands via said keyboard for specifying a top reference area and side reference area of said display;

selecting column and row heading data via said keyboard for said top and side reference areas, respectively, of said display;

storing said selected column and row heading data in second and third dedicated portions of said memory, respectively;

displaying a first portion of said multicolumn table on an editable column viewport of said display, and displaying said column and row heading data in said top and side reference areas of said display, respectively;

generating commands via said keyboard for editing data in a second portion of the multicolumn table not presently on the display;

displaying said second portion of said multicolumn table in the editable column viewpoint; and segmenting the top reference area and scrolling the side reference area by amounts proportional to the location of said data in the second portion of the multicolumn table displayed in the editable column viewport, whereby proper column and row heading data is continually displayed on said display.

2. The column reference area display management method of claim 1 and further including the steps of:

separating said top reference area from said editable column viewport; and separating said side reference area from said editable column viewport.

3. The column reference area display management method of claim 2, wherein said step of separating said top reference area from said editable column viewport displays a horizontal separator bar of video-reverse spaces across the display, and said step of separating said side reference area from said editable column viewport displays a vertical separator column of video-reverse spaces appearing on the display.

4. The column reference area display management method of claim 1 and further comprising the steps of:

displaying a scale line in said editable column viewport; and segmenting said scale line by an amount proportional to the location of the second portion of the multicolumn table displayed in said editable column viewport.

5. The column reference area display management method of claim 1 wherein the step of specifying said top and side reference areas includes the steps of:

defining a width of said side reference area; and defining a number of lines of said column heading data to be displayed in said top reference area.

6. The column reference area display management method of claim 1, wherein said column and row headings of said top and side reference areas are retained in memory for subsequent table editing operations on a document.

7. The column reference area display management method of claim 1, wherein said step of specifying said top and side reference areas includes the step of:

displaying a column reference area menu on the display, said column reference area menu including instructions for defining said top reference area and said side reference area.

8. The column reference area display management method of claim 1 and further comprising the steps of:

storing said keyboard generated commands for editing a column of data;

executing said stored commands for editing a column of data; and cancelling said keyboard generated commands for editing a column of data.

9. A column reference area display management apparatus for use in a word processing system including a keyboard, processor, memory and display, comprising:
- a first dedicated portion of said memory for storing a multicolumn table to be displayed on said display, said multicolumn table having a plurality of columns and rows;
- means responsive to said keyboard for generating commands for specifying a top reference area of said display;
- means responsive to said keyboard for selecting column heading data for said top reference area of said display;
- a second dedicated portion of said memory for storing said selected column heading data;
- means responsive to said keyboard for displaying a first portion of said multicolumn table in an editable column viewport of said display and said column heading data positioned above corresponding columns of the multicolumn table appearing in said editable column viewport;
- means responsive to said keyboard for generating editing commands for editing a column of data in a second portion of the multicolumn table not presently on the display;
- means responsive to said editing commands for displaying said second portion of said multicolumn table in said editable column viewport; and
- means responsive to said editing commands for segmenting the top reference area of said display by an amount proportional to the location of said column of data in said second portion of the multicolumn table, whereby proper column heading data is continually displayed to an operator.

10. A column reference area display management apparatus for use in a word processing system including a keyboard, processor, memory and display, comprising:
- a first dedicated portion of said memory for storing a multicolumn table to be displayed on said display, said multicolumn table having a plurality of columns and rows;
- means responsive to said keyboard for generating commands for specifying a side reference area of said display;
- means responsive to said keyboard for selecting row heading data for said side reference area of said display;
- a second dedicated portion of said memory for storing said selected row heading data;
- means responsive to said keyboard for displaying a first portion of said multicolumn table in an editable column viewport of said display and said row heading data appearing along corresponding rows of the multicolumn table in said editable column viewport;
- means responsive to said keyboard for generating editing commands for editing a row of data in a second portion of the multicolumn table not presently on the display;
- means responsive to said editing commands for displaying said second portion of said multicolumn table in said editable column viewport; and
- means responsive to said editing commands for scrolling the side reference area by an amount proportional to the location of said row of data in said second portion of the multicolumn table, whereby proper row heading data is continually displayed to an operator.

* * * * *